United States Patent [19]

McConnell

[11] Patent Number: 4,523,408

[45] Date of Patent: Jun. 18, 1985

[54] DOOR LIGHT

[76] Inventor: Dale K. McConnell, 597 Old Orchard Rd., Holland, Mich. 49423

[21] Appl. No.: 516,162

[22] Filed: Jul. 21, 1983

[51] Int. Cl.[3] .................................... B60J 5/04

[52] U.S. Cl. .................................... 49/502; 49/171; 49/406; 49/419; 49/505; 52/212

[58] Field of Search ................. 49/501, 502, 169, 171, 49/505, 419, 406; 52/212, 207, 824, 790, 825, 826

[56] References Cited

U.S. PATENT DOCUMENTS

| | | | |
|---|---|---|---|
| 3,449,862 | 6/1969 | Biro | 49/406 |
| 4,034,510 | 7/1977 | Huelsekopf | 49/419 |
| 4,280,309 | 7/1981 | Huelsekopf | 52/212 |
| 4,351,137 | 9/1982 | Enyart et al. | 52/824 X |
| 4,407,100 | 10/1983 | Huelsekopf | 52/212 |

*Primary Examiner*—Philip C. Kannan

*Attorney, Agent, or Firm*—Flynn, Thiel, Boutell & Tanis

[57] ABSTRACT

A door light having exterior and interior rectangular frames which are inserted into the door opening from opposite sides thereof. The exterior frame is molded of a plastics material as an integral, one-piece element having a rearwardly projecting tubular portion which slidably telescopes into a tubular portion defined by the interior frame. The interior and exterior frames slidably telescope until the flanges thereof abut the respective door faces to accommodate variable door widths. The exterior frame has a downwardly and forwardly sloped upper surface along the lower horizontal frame element which, in cooperation with an integral rear wall located behind the inner sash, causes all drainage along the sloped upper surface. Guide tracks are secured along the vertical sides of the frame and define outer and inner channels, with a top sash being stationarily fixed within the upper end of the outer channel.

11 Claims, 9 Drawing Figures

DOOR LIGHT

FIELD OF THE INVENTION

This invention relates to an improved window structure for mounting in a door opening.

BACKGROUND OF THE INVENTION

The so-called "door light" is a window mounted in a door. This "door light" may employ only a single fixed pane, or it may employ upper and lower sashes in a manner similar to a conventional window with the lower sash being movable into an open position.

Typically, door lights are manufactured separately from the doors in which they are mounted. The door is manufactured, and an opening is formed therein, following which the door light is mounted within the opening. The door light typically employs inner and outer frames which fit into the opening from opposite sides thereof. Many doors, however, particularly doors typically utilized in residences, are formed by a thin sheet metal skin which surrounds a rigid core of foamed plastics material. The plastics material can be foamed in place between the front and rear metal skins, or a sliced foam slab can be used to fabricate the unit. Due to this manufacturing process, it is difficult to maintain a precise door thickness. However, since the conventional door light frame is generally designed for a specified door thickness, these frames have necessarily been oversized, and hence have generally required a flexible seal structure along the edges thereof to compensate for door thickness while still permitting a proper seal to be achieved with the front face of the door. This type door light hence lacks the flexibility desired with respect to permitting its mounting on doors of not only substantial variation in thickness tolerances, but on different models of doors which have substantially different thicknesses.

Accordingly, it is an object of this invention to provide an improved door light, specifically a door light having both an upper and a lower sash, the lower sash being slidably movable between opened and closed positions, which door light overcomes the above-mentioned disadvantages.

More specifically, this invention relates to an improved door light having structural and functional features which significantly improve the manufacture, installation and operation of the door light.

A further object is to provide an improved door light, as aforesaid, wherein the frame permits the door light to readily accommodate substantial variations in door thickness while still permitting the frame of the door light to be securely and sealingly mounted within the door light opening.

A still further object is to provide an improved door light, as aforesaid, having improved water drainage, adjustability, and increased strength to both facilitate installation and resist forced entry.

The improved door light of this invention includes exterior and interior frames each of a substantially rectangular configuration. These frames each have outer flanges which overlap and contact the respective face or skin of the door. The frames are inserted into the door opening from opposite sides thereof, and the exterior frame is molded of a plastics material as an integral, one-piece, rectangular element having a rearwardly projecting tubular portion which slidably telescopes into a tubular portion defined by the interior frame. The interior and exterior frames slidably telescope until the flanges thereof abut the respective door faces, thereby accommodating variable door widths, with the interior and exterior frames being fixed together by fasteners such as screws. The one-piece, exterior frame has a downwardly and forwardly sloped upper surface along the lower horizontal frame element, which lower horizontal frame element has an integral rear wall projecting upwardly behind the rear or inner sash, whereby all drainage occurs along the sloped upper surface so that interior drainage holes and the like are wholly eliminated. Appropriate spring-urged guide tracks are secured along the vertical sides of the frame and define outer and inner channels, with a top sash being stationarily fixed within the upper end of the outer channel, and a lower sash being slidably supported within the inner channel. Each sash employs a pane disposed within a molded frame structure formed by interfitting inner and outer rectangular frames, the outer frame being a one-piece member.

Other objects and purposes of the invention will be apparent to persons familiar with structures of this type upon reading the following specification and inspecting the accompanying drawings.

Figure 1:
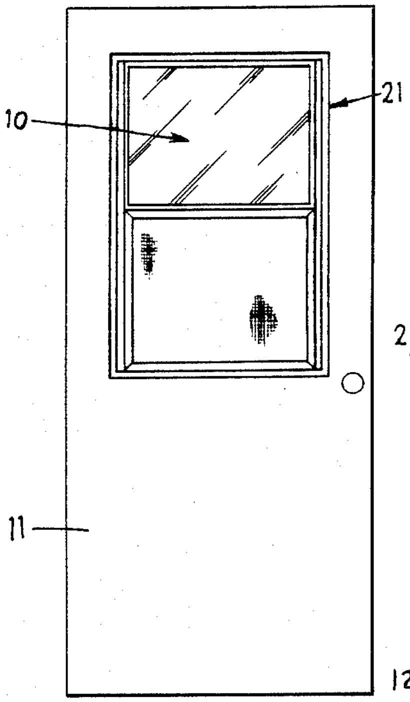
FIG. 1 illustrates a conventional door having a door light according to the present invention mounted therein.

Certain terminology will be used in the following description for convenience in reference only, and will not be limiting. For example, the words "rightwardly", "leftwardly", "upwardly" and "downwardly" will refer to directions in the drawings to which reference is made. The words "exterior" (or "outer") and "interior" (or "inner") will refer to the sides of the door light which respectively conventionally face outwardly and inwardly of the door light when the door is mounted in a residence. The words "inwardly" and "outwardly" will refer to directions toward and away from, respectively, the geometric center of the door light and designated parts thereof. Said terminology will include the words specifically mentioned, derivatives thereof, and words of similar import.

DETAILED DESCRIPTION

FIG. 1 illustrates a door light 10 according to the present invention as mounted within a standard door 11. This door 11 may be of any conventional type but, in the illustrated embodiment of FIG. 3, comprises exterior and interior metal plates or skins 12 and 13, respectively, confining a rigid foamed plastic core 14 therebetween. An opening 16 of substantially rectangular configuration is cut through the door 11 so as to permit mounting of the door light 10 therein.

The door light 10, in the preferred embodiment, is of the double sash type in that it includes a frame 21 which mounts within the door opening 16. This frame 21 mounts thereon upper and lower sash units 22 and 23, respectively, the lower unit 23 being vertically slidable between open and closed positions. A screen unit 24 is fixedly positioned so as to extend over the lower sash unit 23 to prevent insects from flying into the residence when the lower sash unit is in its open position.

The frame 21 includes interior and exterior frame units 26 and 36, respectively, each of which units is of a rectangular ringlike configuration. Each unit 26 and 36 is preferably molded of a relatively rigid plastics material, and at least the exterior frame 36 is molded as an integral, one-piece unit. The interior frame 26, on the other hand, can be formed either as four individual side pieces or as a single integral unit, if desired.

Considering now the structure of the interior frame 26, some includes parallel and horizontally extending top and bottom frame elements 27 and 28 (FIG. 4), respectively, the latter being joined by a pair of parallel vertical side elements 29 extending between the ends thereof so as to form the rectangular ring-shaped frame.

Each of frame elements 27–29 has an identical cross section and includes (see FIG. 3) an interior vertical wall or flange 31 which is adapted to overlie and abuttingly engage the interior door plate 13 in surrounding relationship to the opening 16. This interior flange 31 in turn is rigidly joined to a support wall 32 which projects substantially perpendicularly from the flange 31 partway into the opening 16. This support wall 32 defines thereon a planer inner support surface 33. The support walls 32 of the four frame elements 27–29 hence project into the door opening 16 and effectively define a tubular structure of rectangular cross section, the opening of which tubular structure is defined by the inner support surfaces 33. These surfaces 33 as provided on the upper and lower members 27 and 28 extend substantially horizontally, whereas the support surfaces 33 on the side members extend vertically.

While the interior frame 26 can be formed as a one-piece rectangular member, nevertheless the frame elements 27–29 are preferably formed as individual members since this simplifies the required mold structure. When the frame elements are formed as individual members, then the opposite ends of the side frame elements 29 are preferably provided with thin tabs 34 (FIG. 4) molded thereon for effectively overlapping and hence covering the corner joints formed between the adjacent frame elements. In addition, each of the upper and lower frame elements 27 and 28, at each end thereof, is preferably formed with an integral alignment tab 35 which extends perpendicularly inwardly from the interior support wall 32. The purpose of tabs 35 is explained hereinafter.

Figure 2:
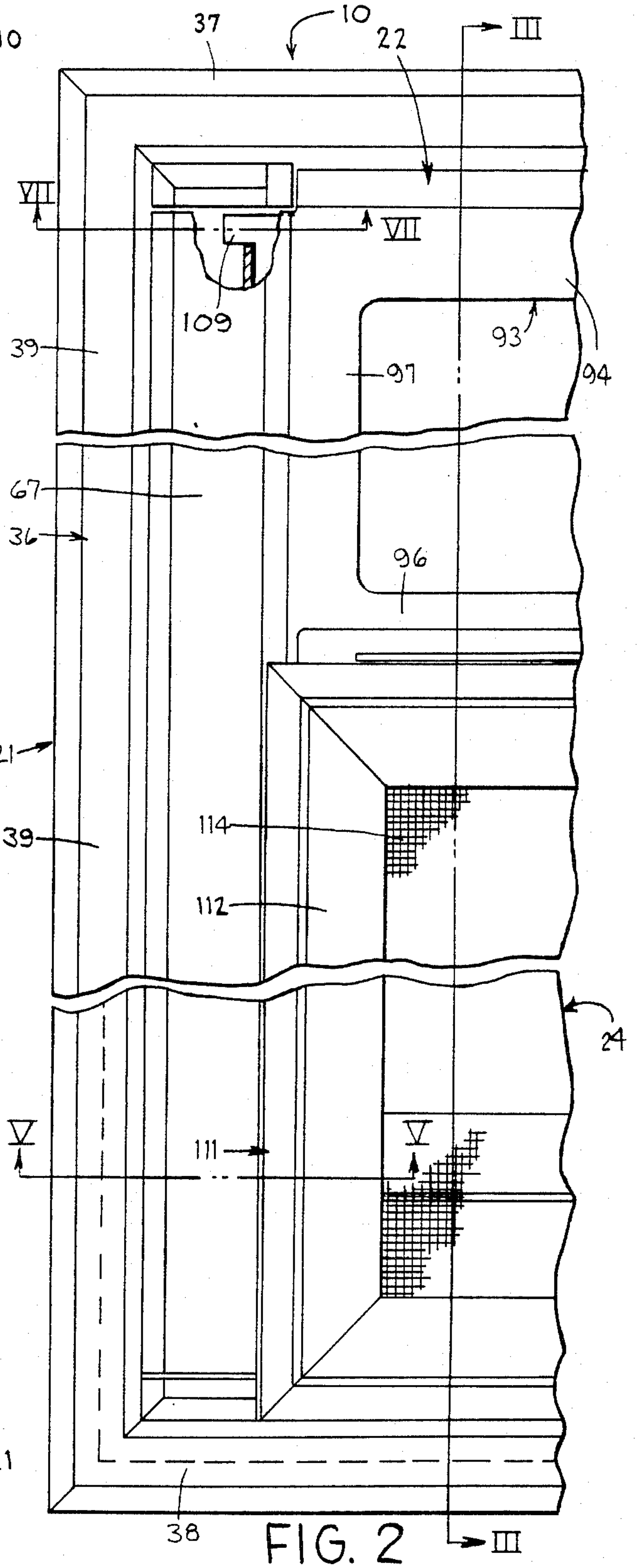
FIG. 2 is an enlarged, fragmentary view illustrating the front or exterior side of the door light.

Considering now the exterior frame unit 36 (FIG. 2), same includes parallel horizontally extending top and bottom frame elements 37 and 38, respectively, rigidly joined together by parallel vertically extending side frame elements 39. These elements 37–39 are all rigidly and integrally formed as a one-piece, rectangular, ringlike frame.

Figure 3:
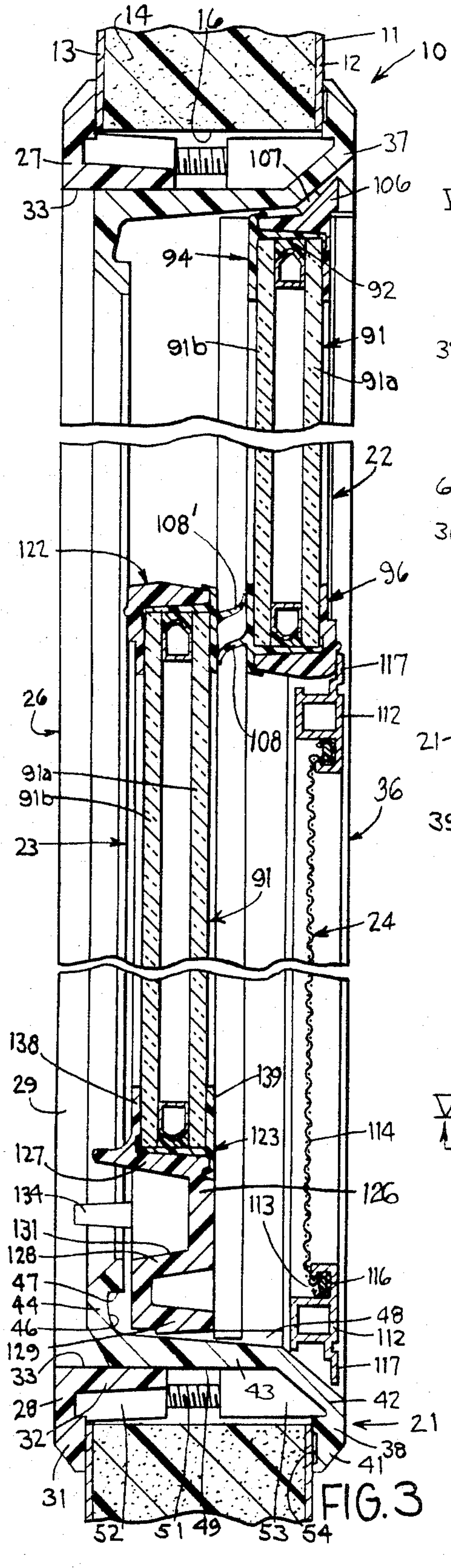
FIG. 3 is a fragmentary sectional view taken substantially along line III—III in FIG. 2.

Each of the frame elements 37–39 has a substantially identical cross section, and with reference to the bottom frame element 38 shown in FIG. 3, includes a substantially vertical front wall or flange 41 which is adapted to overlie and abuttingly engage the exterior surface of the front door plate 12 in close surrounding relationship to the opening 16. This front flange 41 terminates in an intermediate inclined wall 42 which projects inwardly of the door opening 16 at an angle of about 45° relative to the front flange 41. This inclined wall 42 in turn integrally joins to a rearwardly projecting support wall 43 which is of substantial extent so as to project across at least a major portion of the door thickness. This support wall 43 in turn terminates in a rear vertical wall or flange 44 which projects in the opposite direction from the front flange 41, whereby the frame member 38 hence has a substantially S-shaped cross section. This rear flange 44 defines therein a frontwardly facing recess 46, the edge of which defines a shoulder 47 for a purpose explained hereinafter.

The support wall 43 defines an inner support surface 48 which slopes from the rear flange 44 to its junction with the inclined wall 42. This sloped surface 48, at least as provided on the bottom frame element 38, slopes downwardly and forwardly at a small angle relative to the horizontal, such as approximately 10° to 15°, to facilitate drainage of water along surface 44 and inclined wall 42 for discharge exteriorly of the door. This support wall 43 also has an outer planer support surface 49 formed on the opposite side thereof. This surface 49 as provided on the respective top and bottom frame elements 37 and 38 extends substantially horizontally, whereas the support surfaces 49 on the side frame elements 39 extend substantially vertically. These support walls 43 as formed on the integral, one-piece exterior frame 36 hence effectively define a tubular structure which projects horizontally rearwardly into the door opening, which tubular structure is slidably supported on the support walls 32 due to the slidable engagement which exists between the cooperating surfaces 33 and 49. The tubular structure defined by support walls 43 hence horizontally slidably telescopes into the rear or interior frame so as to permit the exterior and interior flanges 41 and 31, respectively, to snugly embrace the opposite surfaces of the door irrespective of variations in door thickness. When the interior and exterior frames are telescoped together, the alignment tabs 35 provided at opposite ends of the interior top and bottom frame elements 27 and 28 effectively embrace the exterior tubular structure therebetween due to these tabs 35 overlapping the exterior surfaces of the support walls 43 associated with the exterior side frame elements 39, as illustrated by FIGS. 4 and 6.

The exterior and interior door frames are suitably fixed in position within the door openings by appropriate threaded fasteners such as screws 51, which screws 51 project through enlargements or bosses 52 formed integrally on the interior frame, with the screws 51 being threadably engaged within similar enlargements or bosses 53 formed on the exterior frame. These screws 51 are accessible solely from the interior frame side of the door, and the bosses 52 and 53 are all effectively hidden below the telescopic tubular structure defined by the support walls 32 and 43.

Figure 4:
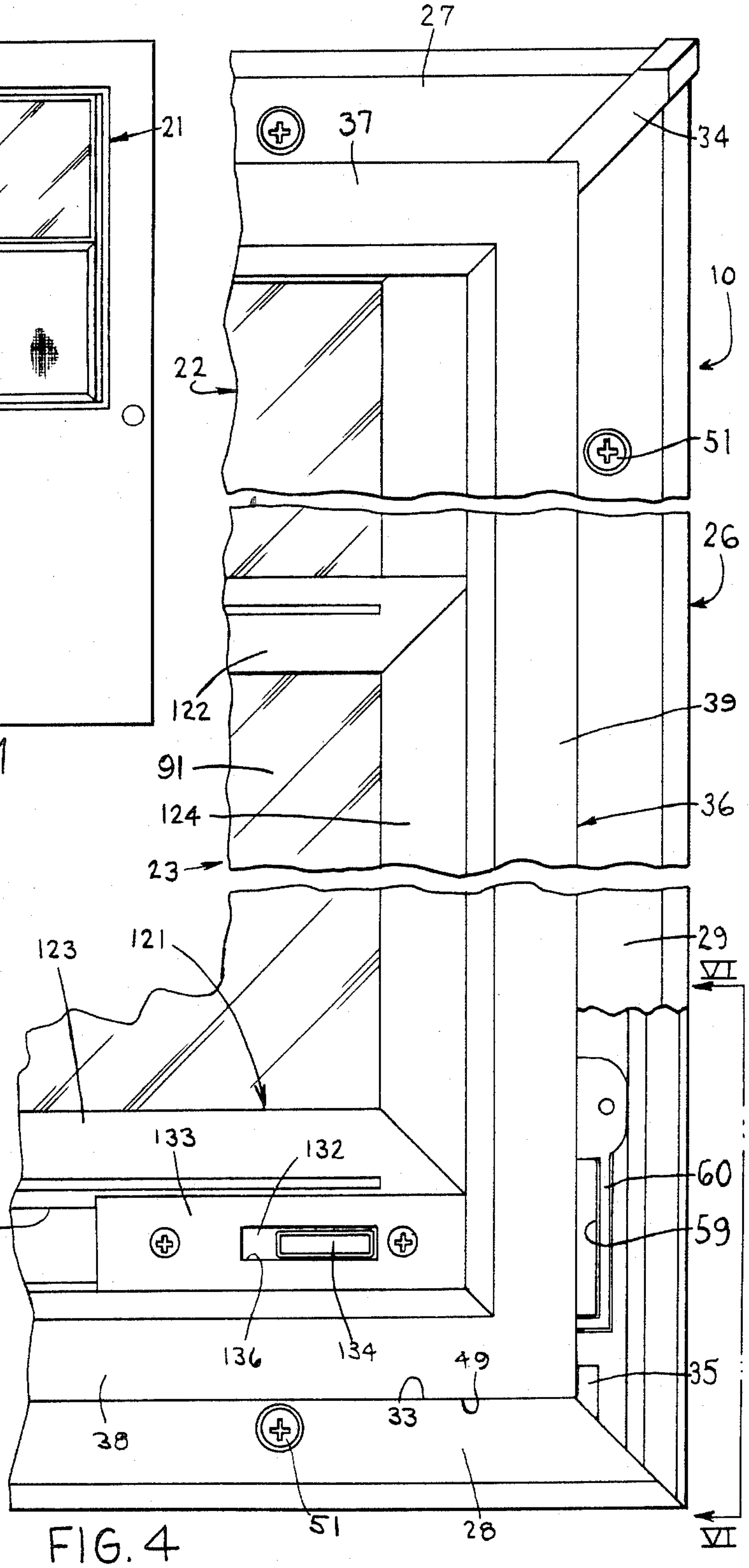
FIG. 4 is a fragmentary elevational view similar to FIG. 2 but illustrating the rear or interior side of the door light.
Figure 6:
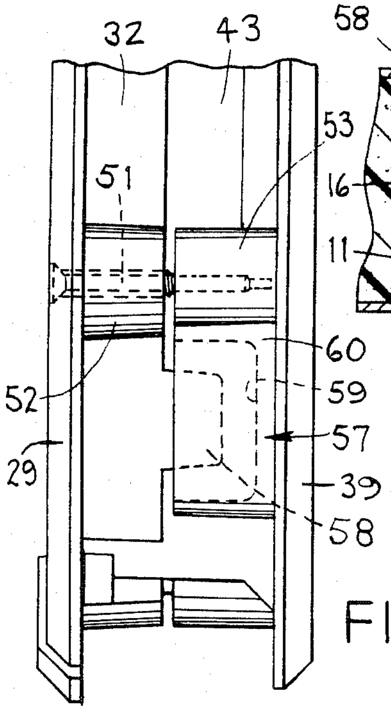
FIG. 6 is a fragmentary side elevational view taken along line VI—VI in FIG. 4.
Figure 5:
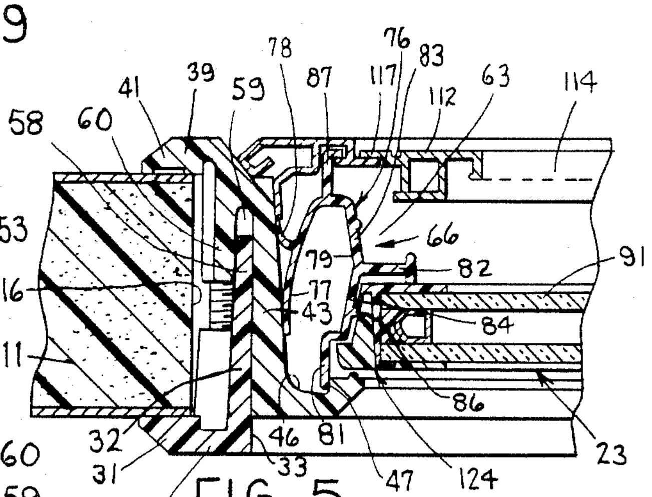
FIG. 5 is a fragmentary sectional view taken along line V—V in FIG. 2.

The interior and exterior frames also have an additional alignment structure 57 cooperating therebetween as illustrated by FIGS. 4–6. This alignment structure 57 includes a flat platelike tongue 58 which is integral with the support wall 32 of each interior frame element 27–29 and projects forwardly therefrom. Each of the frame elements 27–29 preferably has at least two such tongues 58 formed thereon in the vicinity of the opposite ends thereof. Each tongue 58 is adapted to slidably extend into and be snugly accommodated within a narrow slot 59. This slot 59 is defined within a channellike wall structure 60 which is integrally attached to the support wall 43 associated with each of the exterior frame elements 37–39. This alignment structure 57 performs a highly desirable dual function. First, when the interior frame elements 27–29 are formed as individual members, then each interior frame element can be securely mounted on the exterior frame element due to the tongues 58 being snugly but slidably accommodated in the slots 59 so as to facilitate shipment and handling of the overall door light 10 prior to installation within the door opening. Second, during installation of the door light within the door opening, the interfitting of the tongues 58 within the slots 59 maintains the individual interior frame elements 27–29 in proper relationship relative to the exterior frame and prevents cocking or tilting of the individual frame elements during installation.

The front flanges 38 associated with the exterior frame are preferably provided with a small relief opening 54 (FIG. 3) along the inner surface thereof so that this inner or rear surface is hence defined by a pair of spaced beads or ribs which more readily permit limited deformation of the plastics material so as to sealingly engage the exterior door surface throughout the perimeter of the frame.

The two side frame elements 39 are each preferably provided with a small bead or rib 56 (FIG. 7) projecting inwardly from the inner surface of the rear wall 44. This bead 56 preferably extends throughout the vertical length of the rear wall 44 and is effective for creating a guide and improved sealing engagement with the rear sash, as illustrated by FIG. 5.

Figure 7:
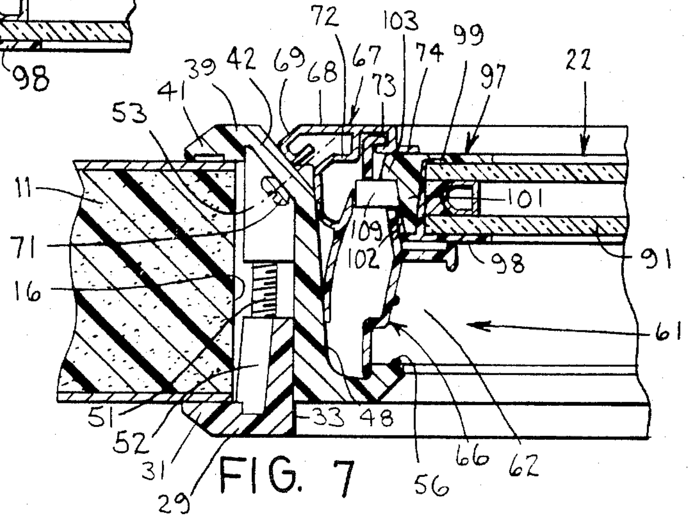
FIG. 7 is a fragmentary sectional view taken along line VII—VII in FIG. 2.

The frame 21 mounts thereon a track structure 61 which extends vertically along each of the side frame elements 39 for supporting therein the upper and lower sash units 22 and 23. This track structure 61, as illustrated in FIGS. 5 and 7, defines inner and outer guide tracks or channels 62 and 63, respectively, which channels extend in parallel vertical relationship along each of the side frame elements 39 so that the respective upper and lower sash units 22 and 23 are supported within the outer and inner channels 63 and 62, respectively.

The track structure 61 is defined by a spring track member 66 and an outer retainer member 67, which members 66 and 67 are mounted on and extend vertically along each of the side frame elements 39. The outer retainer member 67 is generally an extruded aluminum member and, in cross section as illustrated by FIG. 7, has a front wall 68 provided with a channel-like flange 69 along one edge thereof, the latter abutting against the inclined wall 42. Appropriate fasteners such as screws 71 extend from beneath the wall 42 for engagement with the retainer member 67 to fixedly connect it to the side frame element 39. The retainer member 67 also has a Z-shaped center leg 72 which projects rearwardly and stationarily seats against the sloped surface 48. The other longitudinal edge of the front retainer wall 68 defines a rearwardly opening channel 73, which channel terminates in a vertical leg or plate 74.

Considering now the spring track member 66, same includes a substantially U-shaped main body 76 which opens rearwardly and has an inner leg 77 which functions as a cantilevered spring and is disposed in bearing engagement with the sloping surface 48. A small forwardly or outwardly extending seal flap 78 projects from the leg 77. This flap is resiliently deflectable and engages the sloping surface 48 to create a sealed engagement therewith. The main body 76 also has an outer leg 79 which terminates in a free end portion 81 which projects into the recess 46 so that the free end portion 81 hence resiliently bears against the shoulder 47. A substantially T-shaped flange 82 projects outwardly from the outer leg 79 substantially at the middle thereof, which flange 82 effectively defines the separate guide channels 62 and 63 on opposite sides thereof. The outer leg 79 has oppositely sloped wall portions 83 and 84 which effectively define the bottom walls of the channels 63 and 62, respectively, and each of these bottom walls 83–84 is preferably provided with an outwardly projecting bead 86 which provides a sliding but sealed engagement with the adjacent edge of the respective sash unit. The spring track member 66 also has an L-shaped restraining flange 87 which projects forwardly from the bight of the U-shaped main body 76, which restraining flange 87 is confined within the channel 73 associated with the retainer member 67.

The spring track member 66, as described above, is preferably extruded from a plastics material so that the U-shaped main body 76 can hence resiliently deflect, with the legs of the U-shaped main body being resiliently held and constrained in the position illustrated by FIGS. 5 and 6.

Considering now the structure of the upper sash unit 22, same employs a conventional thermal pane 91 (FIG. 3) which, as is well known, employs at least two spaced glass panes 91*a* and 91*b* which are sealingly joined in spaced relation by an intermediate edge seal 92 therebetween. This thermal pane 91 is fixedly supported within a ringlike rectangular frame 93 (FIG. 2) which includes parallel top and bottom frame rails 94 and 96, respectively, rigidly joined together by parallel side frame rails 97.

The side frame rail 97 (FIG. 7) is of substantially channel-shaped cross section and includes inner and outer legs 98 and 99, respectively, which confine the edge of the thermal pane 91 therebetween. These legs 98–99 are joined by a bight 101 which extends across the edge of the thermal pane and is provided with a sloped outer or peripheral wall 102 which terminates at a radially outwardly projecting flange 103. This configuration of the side rails 97 is such that the upper sash 22 hence fits within the opposed outer channels 63 so that the upper sash is hence closely confined between the plate 74 and the leg 82 substantially as illustrated by FIG. 7.

The top frame rail 94 of the upper sash 22 has a cross section which substantially corresponds to the side frame rail 97 except that, as illustrated in FIG. 3, the top frame element 94 has an upwardly projecting tapered flange 106 which projects upwardly so as to be positioned partially in front of the inclined wall 42 associated with the frame member 37. An appropriate seal strip 107 is positioned therebetween.

The lower frame rail 96 also has a cross-sectional configuration corresponding to the side frame element 97, except that the lower frame element 96 has the rear leg thereof provided with a variable thickness so as to result in formation of a rearward surface 108 which is appropriately sloped such that it faces upwardly and rearwardly.

The top sash unit 22, as described above, is confined within the upper ends of the outer channel 63. The upper sash unit is maintained in this position by appropriate stop flanges 109 (FIGS. 2 and 7) which are molded on bights 101 and project outwardly into notched holes at the top ends of the spring tracks 66.

The lower sash unit 23 (FIG. 4) is of generally similar construction in that it also includes an identical thermal pane 91 having a rectangular ringlike frame 121 extending therearound. The frame 121 specifically includes parallel and horizontally extending top and bottom frame rails 122 and 123, respectively, rigidly joined together by parallel vertical side frame rails 124.

The bottom frame rail 123 has, as illustrated by FIG. 3, a substantially Z-shaped cross section 126 which includes upper, middle and lower legs 127, 128 and 129, respectively. The upper and middle legs 127–128 define an elongated channel 131 which opens inwardly and is hence accessible from the inside of the door. This channel 131, adjacent each end thereof, slidably supports a conventional latch plate 132 (FIG. 4) which is suitably constrained within the channel by a cover plate 133 fixed, as by screws, to the bottom frame element 123. The latch plate 132 has a suitable finger grip 134 which projects therefrom through an elongated slot 136 as formed in the cover plate 133. The latch plate is urged by a spring (not shown) into a latching position, and for this purpose the latch plate is provided with a conventional finger or projection on the end thereof which is positioned for engagement with one of several openings (not shown) formed in the track wall 84 for permitting the sash unit 23 to be selectively locked in fully closed, fully open or partially open positions.

The Z-shaped part 126 of the bottom frame rail 123 is integral with and cooperates with a pair of upwardly projecting leg portions 138–139 for defining a channel in which the lower peripheral edge of the thermal pane 91 is seated.

The side frame rails 124, as illustrated in FIG. 5, have a configuration identical to the side frame rails 97 associated with the upper sash unit 22 (as illustrated by FIG. 7), so that further discussion thereof is believed unnecessary. However, as is apparent from comparing FIGS. 5 and 7, the upper and lower sashes are positioned with the frames inverted relative to the sloped or inclined peripheral surfaces thereof.

Similarly, the top frame rail 122 (FIG. 3) is substantially identical in cross section to the bottom frame rail 96 associated with the upper sash unit 22.

To create a sealed relationship between the upper and lower sash units 22 and 23 when in the closed position illustrated by FIG. 3, the bottom frame rail 96 of the upper sash unit has a sealing tab 108 which extends longitudinally therealong and projects rearwardly therefrom. This sealing tab 108 is resiliently deflectable and projects rearwardly to create a sealed engagement with the front leg of the top frame rail 122 associated with the lower sash unit. This lower sash unit has a similar resiliently deflectable sealing tab or flange 108' associated with the top frame rail 122 thereof, which tab 108' projects forwardly for creating a sealed engagement with the rear leg of the bottom frame rail 96.

A preferred construction for the ringlike rectangular frames 93 and 121 associated with the upper and lower sash units 22 and 23, respectively, will now be described. This description relates to the frame 93 associated with the upper sash unit 22 and specifically with reference to FIG. 8.

Figure 8:
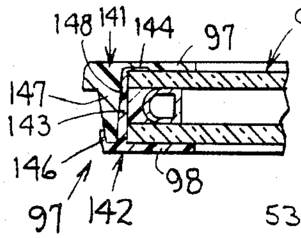
FIG. 8 is a fragmentary sectional view of the sash frame.

Each of the frame rails 94, 96 and 97 defining the frame 93 is basically of a two-piece construction, as typified by the frame rail 97 illustrated in FIG. 8. This frame rail includes an outer frame portion 141 of substantially T-shaped cross section, and an inner frame portion 142 which interfits with the portion 141.

The inner frame portion 142 has a head part which defines the inner leg 98 for overlapping and sealingly engaging the inner surface of the pane 91. The frame portion 142 also has a base leg 143 which extends substantially perpendicularly from the leg 98 so as to overlap the side edge of the pane 91. Base leg 143, at its forward end, terminates in a short inwardly directed flange 144 which overlaps the front corner of the pane 91. Frame portion 142 hence effectively defines a channel so that it can be retained on the edge of the pane 91. It also has a substantially L-shaped flange 146 which is disposed at the inner end of the base leg 143 and projects outwardly therefrom.

The outer frame portion 141 has a head part which defines the front leg 97 which overlaps and sealingly engages the front surface of the pane 91. This front leg 97 is joined to a base leg 147 which projects transversely rearwardly therefrom so as to overlap the base leg 143 of the inner frame portion 142. The rear free edge of the base leg 147 is captivated within the slot defined by the L-shaped flange 146.

The inner flange portion 142 associated with each of the frame rails 94, 96 and 97 is preferably molded of plastics material as an individual elongated element. Hence, due to the channellike structure defined by the frame portion 142, each of these individual inner frame elements 142 can be inserted over a respective edge of the thermal pane 91. On the other hand, the exterior frame portion 141 for all of the frame rails 94, 96 and 97 is preferably molded of a plastics material as an integral, one-piece, rectangular, ringlike frame member such that, after the four individual inner frame members 142 have been mounted on the edges of the thermal pane 91, the single rectangular ringlike exterior frame portion 141 can then be slidably telescoped over the inner frame members 142 by being moved inwardly from the front side of the thermal pane. This is facilitated by providing slightly sloped opposed surfaces at the interface 148 between the opposed base legs 143 and 147. In addition, a suitable adhesive is also preferably provided at this interface 148 to thereby fixedly and rigidly secure the frame portions together.

The structure of the frame 121 for the lower sash unit is preferably formed in the same manner as that of the upper sash unit, as described above, so that further detailed description thereof is believed unnecessary.

Figure 9:
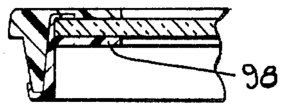
FIG. 9 is a view similar to FIG. 8 but showing a modification.

FIG. 9 illustrates a view similar to FIG. 8 except that the sash frame has been modified to accommodate therein a single pane, rather than a thermal pane. In this case, the structure of the sash frame is identical to that described relative to FIG. 8 except that the rear leg 98 is displaced inwardly so as to accommodate the reduced width of the pane.

The opening which is normally covered by the movable lower sash unit 23 is also suitably covered by the screen unit 24 (FIGS. 2 and 3), which unit is positioned substantially directly below the upper sash unit 22. The screen unit 24 includes a rigid, rectangular, ringlike frame 111 formed by top, bottom and side rails 112 which are rigidly fixed together. These rails 112, which normally comprise extruded aluminum elements, all define a rearwardly opening channel 113. A sheet of conventional meshlike screening 114 extends across the opening defined by the frame 111, and the edge of the screen 114 is captivated within the channel 113 by means of a conventional retaining bead 116. Each of rails 112 has an outwardly projecting flange 117. This flange 117 on the top rail suitably overlaps the lower frame element 96 associated with the upper sash unit. In similar fashion, the flanges 117 on the side rails overlap the retainer plates 74. The screen unit 24 is fixedly held in position by conventional retainer clips (not shown), such as movable clips having rotatable thumb screws, which are mounted on the edge of the screen unit frame and cooperate with the rear sides of the retainer plates 74. Such retainer clips are conventional, so that description of same is believed unnecessary.

The operation of the door light is believed self-evident, so that further detailed description thereof is believed unnecessary.

Mounting of the individual sash units within the respective channels or tracks can be easily accomplished merely by inserting one side edge of the respective sash unit into its channel by an amount sufficient to cause resilient deflection of the spring track member 66, whereupon the other side edge can hance be inserted in its respective channel, following which the spring track member will reexpand so as to properly centrally position the sash unit between the opposed guide tracks.

With the construction of the door light as illustrated and as described, the presence of the integral one-piece exterior frame 36 and the fact that the lower frame element 38 thereof has an upper surface 48 which slopes downwardly and outwardly and is otherwise free of guide channels and the like, hence permits all water or moisture to freely run off the surface 48 for discharge along the exterior side of the door. With this construction, interior drain channels, passages and holes are hence eliminated, and thus not only is drainage of water greatly facilitated, but protection for the underlying door and door light structure is significantly improved.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A prefabricated door light unit for use in an opening formed in a door, said door light unit comprising:

ringlike frame means adapted to be fixedly mounted in said door opening and defining therein a window opening;

window pane means mounted on said frame means for covering said window opening;

said frame means including inner and outer ringlike frame units which mount in said door opening from respective inner and outer sides thereof, said inner and outer frame units having a slidable telescopic connection therebetween when mounted within said door opening;

said outer frame unit comprising an integral, one-piece, ringlike, preformed outer frame having a ringlike peripheral wall which is adapted for engagement with the outer face of the door in surrounding relationship to the door opening, said outer frame also including a tubular support wall structure integrally fixed to said peripheral wall and projecting substantially transversely therefrom into said door opening, said tubular wall structure defining an outer peripheral support surface thereon, said tubular wall structure also defining said window opening therein;

said outer frame having a substantially S-shaped cross section and including inner and outer approximately parallel walls which are integral with and project in opposite directions from the opposite ends of an intermediate wall, said outer wall defining said peripheral wall, and said intermediate wall defining said tubular wall structure, said intermediate wall defining said outer support surface on the outer periphery thereof with said latter surface extending substantially perpendicular to the vertical plane of the door opening, said intermediate wall defining thereon an inner peripheral surface which, at least along the bottom of said outer frame, slopes downwardly as it projects from the inner wall to said outer wall to permit drainage of water therefrom exteriorly of the door;

said inner frame unit comprising a rectangular ringlike frame having a peripheral wall which is positionable adjacent and engageable with the inner face of the door in surrounding relationship to the door opening, said inner frame also defining transverse support walls which are fixed to and project transversely from said peripheral wall into said door opening, said transverse walls defining thereon an inner support surface whereby said transverse walls project into said door opening into the region between the edge of said door opening and said tubular wall structure so that said inner and outer support surfaces are slidably engaged with one another so that the inner and outer frames can be slidably moved toward one another until the respective peripheral walls thereof respectively engage the inner and outer faces of the door; and said frame means including fastener means extending between said inner and outer frames for fixedly connecting same together.

2. A door light unit according to claim 1, wherein said pane means is disposed entirely within said tubular wall structure forwardly of said inner wall.

3. A door light unit according to claim 1, wherein each said inner and outer frame is of a substantially rectangular ringlike configuration and includes opposed and substantially parallel top and bottom frame elements joined together by parallel vertical side frame elements, track means fixed to and projecting vertically along the side frame elements of said outer frame for defining parallel inner and outer guide channels, said pane means including inner and outer sash units respectively mounted in the inner and outer channels, the inner sash unit being vertically slidable movable within its respective channel, said track means and the sash units mounted thereon being supported directly on said outer frame forwardly of said inner wall.

4. A door light according to claim 1, wherein said inner frame unit is defined by four independent, elongated frame elements which cooperate to define the ringlike configuration, each said frame element being of substantially L-shaped cross section having one leg defining a portion of said peripheral wall and the other leg defining one of the transverse support walls.

5. A door light according to claim 4, including slidable alignment means coacting between each said frame element and said outer frame for permitting the individual frame elements to be slidably and supportingly telescoped into the outer frame, said alignment means including a tongue which is integral with and projects forwardly of the transverse support wall associated with each said frame element, and slot means associated with the support wall structure of said outer frame for slidably accommodating therein the tongues associated with said frame elements.

6. A prefabricated door light unit for use in an opening formed in a door, said door light unit comprising:

rectangular ringlike frame means fixedly mountable within the door unit and defining a window opening therethrough, said frame means including inner and outer frame units which project into the window opening from opposite sides thereof and means for fixedly connecting said inner and outer frame units together, said inner and outer frame units having cooperating means for permitting said units to slidably telescope for accommodating the variable thickness of the door;

said outer frame unit comprising a one-piece, integral, ringlike rectangular frame having opposed and substantially parallel vertical side frame elements rigidly joined together by opposed and substantially parallel horizontal top and bottom frame elements;

track means fixed to each of the side frame elements and projecting vertically therealong, each said track means defining therein a pair of parallel, vertically extending, inwardly opening channels disposed in side-by-side relationship;

an upper sash unit fixedly positioned within the opposed outer channels adjacent the upper ends thereof, and a lower sash unit slidably supported within the opposed inner channels and being normally maintained in a closed position adjacent the lower ends thereof;

each of said sash units having a pane enclosed within a ringlike rectangular frame of plastic material extending completely around the periphery of said pane, each said sash frame having opposite side portions which are individually slidably confined within the opposed respective channels; and each said sash frame having outer and inner ringlike rectangular frame portions which telescopically interfit one within the other for surrounding and confining the complete periphery of the respective pane, the inner frame portion being substantially channel-shaped in cross section for surrounding the peripheral edge of the pane, the channel-shaped cross section of the inner frame portion including a rear leg which overlaps and sealingly engages the rear surface of the pane adjacent the periphery thereof, the inner frame portion including a short front leg or flange which overlaps the front surface of the pane adjacent the periphery thereof, said front and rear legs of said inner frame portion being joined by a base wall which extends therebetween and overlaps the peripheral edge of the pane, and said outer frame portion being formed as an integral one-piece ringlike member constructed of molded plastic material, said outer frame portion having a substantially L-shaped cross section which includes a front leg part which exteriorly overlaps the front leg of the inner frame portion and extends therepast so as to directly sealingly engage the front surface of the pane, said outer frame portion also having a peripheral leg part which projects rearwardly from the front leg part and defines a substantially tubular wall structure which is slidably telescoped over the base legs defined by the inner frame portion.

7. A door light according to claim 6, wherein the outer frame has a flange fixed to and projecting transversely inwardly therefrom adjacent the rearward end of said bottom frame element, said track means and said sash units being positioned forwardly of said flange.

8. A door light according to claim 6, wherein said inner and outer frames have opposed surfaces which slidably support one another for movement in a direction substantially perpendicular to the plane of the door opening, said inner and outer frames being free of any surfaces which create a shoulder or the like which would prevent unrestricted adjustment in the width of the frame over a selected extent so as to accommodate the variable door width.

9. A door light according to claim 6, wherein the inner frame portion is defined by four separate and independent elongated frame elements each having said channel-shaped cross section and each being adapted to be positioned in engagement with one of the elongated peripheral edges of the pane.

10. A door light according to claim 6, wherein the inner frame portion has a substantially L-shaped flange fixed to the base leg adjacent the inner end thereof, said L-shaped flange being disposed adjacent the outer surface thereof and defining a forwardly opening slot, and the peripheral leg part of said outer flange portion having its inner end projecting into said latter slot for confinement by said L-shaped flange.

11. A door light according to claim 10, wherein the inner frame portion is defined by four separate and independent elongated frame elements each having said channel-shaped cross section and each being adapted to be positioned in engagement with one of the elongated peripheral edges of the pane.

* * * * *